(12) United States Patent
Bartkowicz et al.

(10) Patent No.: US 9,359,962 B2
(45) Date of Patent: Jun. 7, 2016

(54) ENGINE BRAKING

(71) Applicants: Michael D. Bartkowicz, Oswego, IL (US); Paul Gottemoller, Palos Park, IL (US); Luis Carlos Cattani, Aurora, IL (US)

(72) Inventors: Michael D. Bartkowicz, Oswego, IL (US); Paul Gottemoller, Palos Park, IL (US); Luis Carlos Cattani, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/395,724

(22) PCT Filed: Apr. 22, 2013

(86) PCT No.: PCT/US2013/037516
§ 371 (c)(1),
(2) Date: Oct. 20, 2014

(87) PCT Pub. No.: WO2013/163054
PCT Pub. Date: Oct. 31, 2013

(65) Prior Publication Data
US 2015/0107553 A1    Apr. 23, 2015

Related U.S. Application Data

(60) Provisional application No. 61/637,881, filed on Apr. 25, 2012.

(51) Int. Cl.
*F02D 13/04* (2006.01)
*F02B 37/18* (2006.01)
(Continued)

(52) U.S. Cl.
CPC .................. *F02D 13/04* (2013.01); *F01L 13/06* (2013.01); *F02B 37/004* (2013.01); *F02B 37/013* (2013.01); *F02B 37/127* (2013.01); *F02B 37/18* (2013.01); *F02B 37/22* (2013.01); *F02D 9/02* (2013.01); *F02D 23/00* (2013.01); *F02B 29/0412* (2013.01); *F02D 2009/0242* (2013.01);
(Continued)

(58) Field of Classification Search
CPC ........ F02D 13/04; F02B 37/013; F02B 37/18; F02B 37/127
USPC .............. 123/323, 320, 321, 322, 324, 559.1, 123/562, 564; 60/598, 600, 602, 605.1, 60/605.2, 611, 612
See application file for complete search history.

(56) References Cited

U.S. PATENT DOCUMENTS 6,779,506 B1    8/2004    Hlavac et al.
7,055,496 B1    6/2006    Majewski
(Continued)

*Primary Examiner* — Mahmoud Gimie
(74) *Attorney, Agent, or Firm* — Jeffrey P. Calfa; Jack D. Nimz

(57) ABSTRACT

A system and method for controlling the quantity of compressed air that may enter into an engine cylinder during the intake stroke of a piston during an engine braking event. A control throttle may be positioned to restrict the quantity of compressed air that may enter into the cylinder during the intake stroke. The control throttle may also be positioned downstream of the engine and configured to adjustably restrict the quantity of exhaust gas that may be delivered to a turbine. By restricting the exhaust gas delivered to the turbine, the power generated by the turbine that is used by the compressor to compress intake air may also be reduced. Moreover, by controlling the power available to the compressor, the quantity of compressed intake air may be controlled, which allows for control of the quantity of compressed air that enters into the cylinder during the compression stroke.

2 Claims, 4 Drawing Sheets

(51) Int. Cl.
*F02B 37/12* (2006.01)
*F02D 23/00* (2006.01)
*F02B 37/00* (2006.01)
*F02B 37/013* (2006.01)
*F01L 13/06* (2006.01)
*F02B 37/22* (2006.01)
*F02B 29/04* (2006.01)
*F02M 25/07* (2006.01)
*F02D 9/02* (2006.01)

(52) U.S. Cl.
CPC ........ *F02M25/0707* (2013.01); *F02M 25/0731* (2013.01); *Y02T 10/144* (2013.01)

(56) References Cited

U.S. PATENT DOCUMENTS

| | | |
|---|---|---|
| 2001/0023668 A1 | 9/2001 | Guzman |
| 2001/0029919 A1 | 10/2001 | Cagney |
| 2001/0045209 A1 | 11/2001 | Balekai |
| 2002/0017253 A1 | 2/2002 | Danesh |
| 2002/0023624 A1 | 2/2002 | Meisner |
| 2002/0023630 A1 | 2/2002 | Balekai |
| 2002/0029772 A1 | 3/2002 | Isaac |
| 2002/0053340 A1 | 5/2002 | Lei |
| 2002/0117141 A1 | 8/2002 | Zielke |
| 2002/0121251 A1 | 9/2002 | Watson |
| 2002/0139322 A1 | 10/2002 | Murglin |
| 2002/0162524 A1 | 11/2002 | de Ojeda |
| 2002/0162526 A1 | 11/2002 | Yager |
| 2002/0166516 A1 | 11/2002 | Song |
| 2002/0174854 A1 | 11/2002 | Lei |
| 2002/0179029 A1 | 12/2002 | Watson |
| 2002/0179040 A1 | 12/2002 | Dalla Betta |
| 2003/0051693 A1 | 3/2003 | Vichinsky |
| 2003/0079705 A1 | 5/2003 | Lutz |
| 2003/0079723 A1 | 5/2003 | Mollin |
| 2003/0116113 A1 | 6/2003 | Ward |
| 2003/0136372 A1 | 7/2003 | Gui |
| 2003/0164153 A1 | 9/2003 | Hlavac |
| 2003/0164163 A1 | 9/2003 | Xin |
| 2003/0183185 A1 | 10/2003 | Sun |
| 2003/0183197 A1 | 10/2003 | de Ojeda |
| 2003/0188720 A1 | 10/2003 | Sadfa |
| 2003/0205216 A1 | 11/2003 | Seymour, II |
| 2003/0234003 A1 | 12/2003 | Sadfa |
| 2004/0011025 A1 | 1/2004 | Gui |
| 2004/0031467 A1 | 2/2004 | Bernhardt |
| 2004/0060537 A1 | 4/2004 | Gui |
| 2004/0069281 A1 | 4/2004 | Corba |
| 2004/0069284 A1 | 4/2004 | Corba |
| 2004/0074480 A1 | 4/2004 | Chen |
| 2004/0099251 A1 | 5/2004 | Miranda |
| 2004/0112316 A1 | 6/2004 | Oleksiewicz |
| 2004/0112323 A1 | 6/2004 | Liu |
| 2004/0129247 A1 | 7/2004 | Majewski |
| 2004/0144372 A1 | 7/2004 | Ricart-Ugaz |
| 2004/0149264 A1 | 8/2004 | Pecheny |
| 2004/0159310 A1 | 8/2004 | Seymour, II |
| 2004/0159311 A1 | 8/2004 | Anello |
| 2004/0177828 A1 | 9/2004 | Liu |
| 2004/0182372 A1 | 9/2004 | Kennedy |
| 2004/0194744 A1 | 10/2004 | Yager |
| 2004/0211394 A1 | 10/2004 | Yager |
| 2004/0237921 A1 | 12/2004 | de Ojeda |
| 2004/0237922 A1 | 12/2004 | Merrick |
| 2005/0011489 A1 | 1/2005 | Majewski |
| 2005/0066929 A1 | 3/2005 | Liu |
| 2005/0076859 A1 | 4/2005 | Sidor |
| 2005/0097884 A1 | 5/2005 | Verkiel |
| 2005/0115240 A1 | 6/2005 | Schueren |
| 2005/0115532 A1 | 6/2005 | Schueren |
| 2005/0115537 A1 | 6/2005 | Liu |
| 2005/0133009 A1 | 6/2005 | Rowells |
| 2005/0177301 A1 | 8/2005 | Bishop |
| 2005/0183684 A1 | 8/2005 | Strepek |
| 2005/0205053 A1 | 9/2005 | Liu |
| 2005/0205070 A1 | 9/2005 | Wu |
| 2005/0211218 A1 | 9/2005 | Liu |
| 2005/0241622 A1 | 11/2005 | Dickerson |
| 2005/0247294 A1 | 11/2005 | Rowells |
| 2005/0284441 A1 | 12/2005 | Liu |
| 2005/0288846 A1 | 12/2005 | Liu |
| 2006/0005791 A1 | 1/2006 | Obidi |
| 2006/0005805 A1 | 1/2006 | Liu |
| 2006/0048754 A1 | 3/2006 | Naganawa |
| 2006/0060171 A1 | 3/2006 | Liu |
| 2006/0060172 A1 | 3/2006 | Liu |
| 2006/0060173 A1 | 3/2006 | Wei |
| 2006/0075995 A1 | 4/2006 | Liu |
| 2006/0081229 A1 | 4/2006 | Gronberg |
| 2006/0144360 A1 | 7/2006 | Beaucaire |
| 2006/0169228 A1 | 8/2006 | Seymour |
| 2006/0200297 A1 | 9/2006 | Liu |
| 2006/0207581 A1 | 9/2006 | Minetto |
| 2006/0213045 A1 | 9/2006 | Calviti |
| 2006/0254542 A1 | 11/2006 | Strickler |
| 2006/0272601 A1 | 12/2006 | Balaraman |
| 2006/0272606 A1 | 12/2006 | Rodriguez |
| 2006/0288985 A1 | 12/2006 | Perini |
| 2007/0039597 A1 | 2/2007 | Zukouski |
| 2007/0084427 A1 | 4/2007 | Petrosius |
| 2007/0084431 A1 | 4/2007 | Omachi |
| 2007/0089716 A1 | 4/2007 | Saele |
| 2007/0089717 A1 | 4/2007 | Saele |
| 2007/0157893 A1 | 7/2007 | Wei |
| 2007/0175457 A1 | 8/2007 | Lyons |
| 2007/0235003 A1 | 10/2007 | Cagney |
| 2007/0266705 A1 | 11/2007 | Wood |
| 2007/0266999 A1 | 11/2007 | Clarke |
| 2008/0035100 A1 | 2/2008 | Snyder |
| 2008/0216795 A1* | 9/2008 | Dietz ............. F02B 37/001 123/344 |
| 2008/0290188 A1 | 11/2008 | Zukouski |
| 2008/0314371 A1 | 12/2008 | Wyatt |
| 2008/0319599 A1 | 12/2008 | Ptak |
| 2009/0000275 A1 | 1/2009 | Zielke |
| 2009/0025696 A1* | 1/2009 | Lovgren ............. F02B 37/105 123/559.1 |
| 2009/0101123 A1 | 4/2009 | Brogdon |
| 2009/0139500 A1 | 6/2009 | Gronberg |
| 2009/0139920 A1 | 6/2009 | Dhawale |
| 2010/0012068 A1 | 1/2010 | Rodriguez |
| 2010/0030452 A1 | 2/2010 | Rodriguez |
| 2010/0037856 A1 | 2/2010 | Dickerson |
| 2011/0036088 A1 | 2/2011 | Xin |
| 2011/0100324 A1 | 5/2011 | Xin |
| 2011/0100340 A1* | 5/2011 | Mukkala ............. F02D 41/0007 123/564 |
| 2011/0120411 A1 | 5/2011 | Ren |
| 2011/0289914 A1* | 12/2011 | Afjeh ............. F01N 3/0235 60/602 |

* cited by examiner

ENGINE BRAKING

BACKGROUND

Engine braking, including compression release brakes, are typically used to slow down momentum of a vehicle having an internal combustion engine after the driver has released, or is no longer engaging, the accelerator, such as releasing the operator's foot from the accelerator pedal. Engine braking may provide a way for slowing the movement of a vehicle that assists, or in certain circumstances operates in lieu of, traditional service brakes, such as friction brakes or magnetic brakes.

Traditionally, an engine brake, such as, for example, two or four-cycle Jake brake, develops its braking horse power by converting a moving vehicles forward momentum into mechanical work. More specifically, when the driver is not engaging the vehicle's accelerator, and the supply of fuel to the cylinders is shut off, the rolling of the tries or wheels of the vehicle causes the continued movement of the vehicle's drivetrain. Such continued movement of the drivetrain forces the crankshaft to continue to rotate, which is translated into the continued displacement of the pistons within the cylinders. Accordingly, as such displacement of the pistons includes the pistons undergoing a compression stroke, air within the cylinder continues to be is compressed as the pistons are displaced toward a top dead center position in the cylinder. With compression release braking, the pressure of such compressed air in the cylinder provides a force that generally opposes this displacement of the piston. Moreover, the opposing force, or engine braking horsepower, of the compressed air during such a compression stroke may slow the movement of the pistons, and thereby assist in slowing the momentum of the vehicle.

Further, when the piston approaches, reaches, or passes an upper position in the cylinder, such as the top dead center position, the compressed air may be released from the cylinder, such as through an exhaust valve in the cylinder head. An intake valve may then be re-opened so that intake air that is to be pressurized by the subsequent compression stroke enters into the cylinder during an intake stroke. According to certain applications, this process may continue to be repeated until the engine speed and/or vehicle is reduced to a desired level, such as, for example, the crankshaft being reduced to a range of revolutions per minute (rpm) (e.g. 1000 rpm).

One of the parameters that influence the amount of power developed by a compression release brake is the amount of compressed air delivered to the cylinder by the turbocharger during the intake stroke. For compression release brakes, engine control systems typically control the turbine side of the turbocharger to limit boost performance of the compressors that compress the air that enters the cylinder during an intake stroke. For example, a turbine(s) often uses exhaust gas to generate power that is used by compressor(s) to increase the pressure, and thus mass, of air that is supplied to the cylinder during an intake stroke. Systems may therefore limit or reduce the quantity of exhaust gas used by the turbine to reduce the amount of compressed air delivered to the power cylinder by the compressor(s) during the intake stroke. One example of decreasing the quantity of exhaust gas used to operate the turbine is by changing the position of the vane located at the inlet of the turbine of a variable-geometry turbocharger (VGT). Such alteration of the vane position may result in a reduction in exhaust energy available to, and power generated by, the turbine, and thereby decreases the amount of power available to the compressor to compress air. Such a reduction in compressor power may result in a reduction in the quantity of compressed air that is delivered to the intake valve and associated engine cylinder during the intake stroke.

However, such adjustments of the turbine vane may be, at least during certain operating conditions, insufficient to decrease the quantity of air being compressed by the compressor. For example, at high engine speeds, even with a change in the vane position, the turbine may still generate sufficient power for the compressor to compress a larger quantity of air than is desired for the engine brake. As a consequence, a larger than desired quantity of compressed air may enter into the engine cylinder during the intake stroke of an engine braking event. Moreover, such an overload of compressed air in the cylinder may result in an over boost in the force opposing the displacement of the piston during the compression stroke(s), thereby causing undue stresses on engine components, including an overload of the camshaft brake lobe. Further, such over boost may result in the production of unacceptable camshaft hertz stresses when the exhaust valve is open as the piston attains a top dead cylinder position in the cylinder.

BRIEF SUMMARY

An aspect of an illustrated embodiment is a system for controlling the quantity of compressed air that may enter into the cylinder of an engine during the intake stroke of a piston during an engine braking event. The system includes a control throttle that is positioned upstream of the cylinder. The control throttle is configured to adjustably restrict a quantity of compressed air that may enter into the cylinder during the intake stroke of the piston. The system also includes an engine control unit that is configured to control the position of the control throttle so as to control the quantity of compressed air being restricted by the control throttle.

According to another embodiment, a system is provided for controlling the quantity of exhaust gas from an engine braking event that may enter into a turbine of a turbocharger. The system includes a control throttle positioned upstream of the turbine. The control throttle is operably connected to an auxiliary exhaust line. The control throttle is configured to adjustably divert at least a portion of the exhaust gas from the engine braking event into at least a portion of the auxiliary exhaust line. The auxiliary exhaust line is configured to allow the diverted exhaust gas flowing through the auxiliary exhaust line to bypass the turbine. Further, the system includes an engine control unit that is configured to control the position of the control throttle so as to control the quantity of exhaust gas diverted into the auxiliary exhaust line.

Additionally, according to another embodiment, a method is provided for controlling the quantity of compressed air that may enter into the cylinder of an engine during the intake stroke of a piston during an engine braking event. The method includes initiating an engine braking event. Further, an engine control unit determines the quantity of air being compressed by a compressor. The position of a control throttle is adjusted so as to control the quantity of compressed air entering into the cylinder during the intake stroke of the piston.

According to another embodiment, a method is provided for controlling the quantity of exhaust gas from an engine braking event that may enter into a turbine of a turbocharger. The method includes initiating an engine braking event. Additionally, an engine control unit determines the quantity of exhaust gas being exhausted from the engine during the engine braking event. The method further includes adjusting the position of a control throttle to control the quantity of exhaust gas flowing through an auxiliary exhaust line. Additionally, the exhaust gas flowing through the auxiliary exhaust line is diverted around the turbine so that the exhaust gas flowing through the auxiliary exhaust line bypasses the turbine.

DETAILED DESCRIPTION

Figure 1:
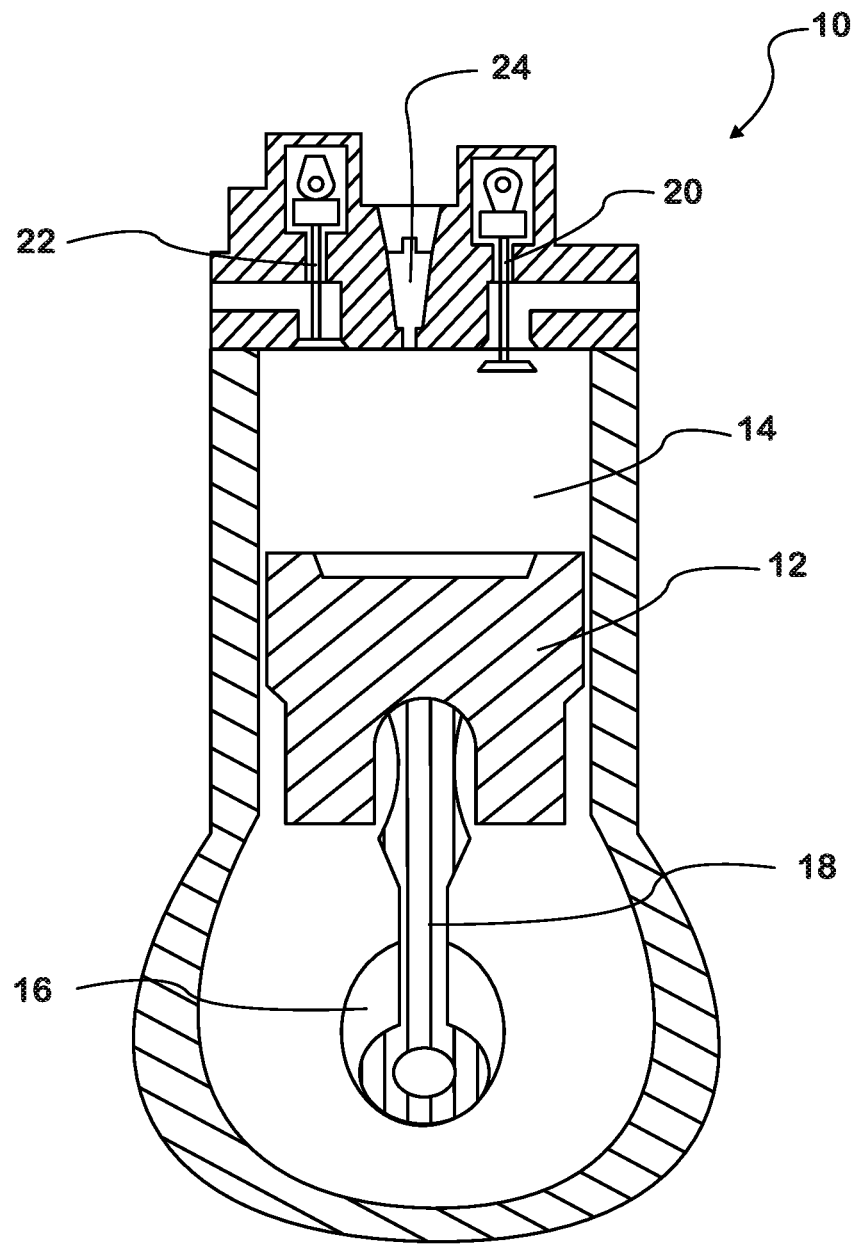
FIG. 1 is an exemplary representation of a portion of a four-stroke internal combustion engine.

For illustration purposes, FIG. 1 is an exemplary representation of a portion of a four-stroke internal combustion engine 10. More specifically, FIG. 1 illustrates a piston 12 housed in a cylinder 14 of the engine 10. The piston 12 may be operably connected to the crankshaft 16, such as by a connecting rod 18. The control of air into and out of the cylinder 14 may be controlled by the actuation of intake and exhaust valves 20, 22, respectively. Additionally, fuel may be introduced into the cylinder 14 by a variety of different devices, such as, for example, through a fuel injector 24.

In an effort to assist slowing and/or stopping the movement of the vehicle, some vehicles are equipped with an engine brake. The activation of the engine brake may be manually controlled by the operator of the vehicle, such as, for example, by switch that provides the option of turning the engine brake feature on or off. Alternatively, the engine brake may be activated or deactivated automatically, such as, for example by the engine control unit (ECU). Accordingly, during certain periods of vehicle operation, such as, for example, while driving on a flat road with minimal traffic, the benefits of an engine brake may be unnecessary. In such situations, the engine brake may be deactivated. However, during other periods of operation, such as while attempting to reduce the speed of a vehicle that is descending downhill grades, such as mountainous or hilly areas, the engine brake may be activated such that the engine brake may assist in reducing and/or controlling the speed of the vehicle. Further, in such situations, the use of the engine brake may prevent wear, damage and/or a total loss of the vehicle's service brakes that can otherwise lead to runaway vehicle situations.

Figure 2:
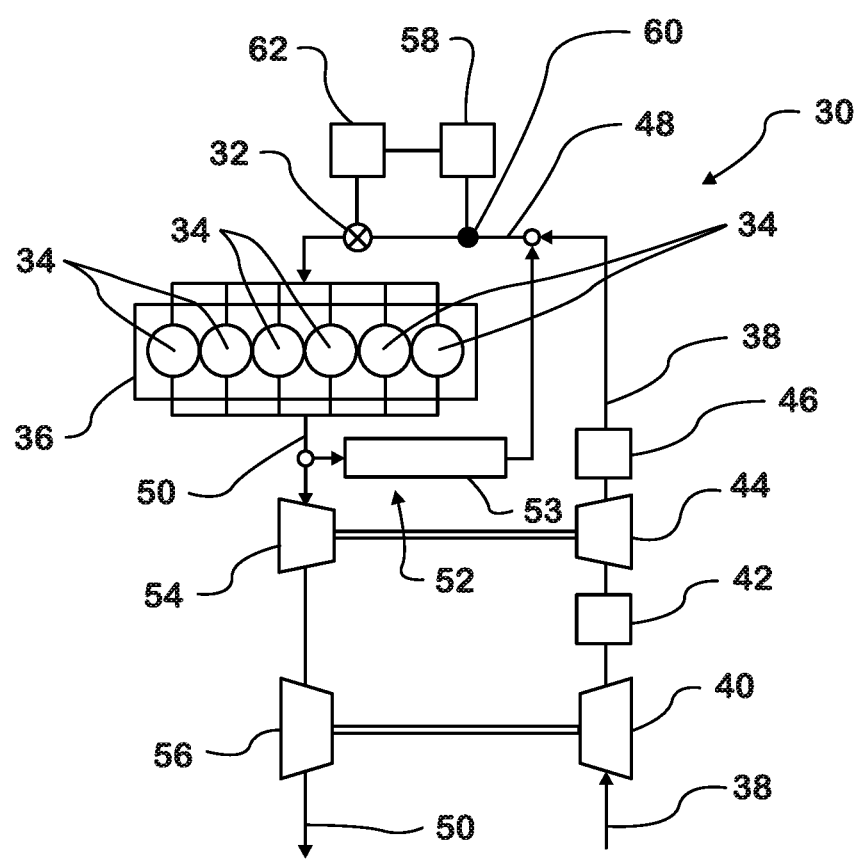
FIG. 2 illustrates an engine system that includes a control throttle in the intake air stream that is configured to control the amount of air delivered to the cylinder of an engine during the intake stroke of an engine braking event.

FIG. 2 illustrates an engine system 30 that includes a control throttle 32 in the intake air stream that is configured to control the amount of air delivered to the cylinder 34 of an engine 36 during an intake stroke of an engine braking event. As shown, air for use in the operation of the engine system 30, such as for use during the internal combustion process, may flow along an intake line 38 that includes various hoses and/or tubes. For example, as shown in FIG. 2, air passes along a first portion of the intake line 38 and into a low pressure compressor 40 before flowing along a second portion of the intake line 38 to the interstage cooler 42. The air then flows through a high pressure compressor 44 and high pressure charged air cooler 46 before flowing through the another portion of the intake line 38 to an intake manifold 48.

The air may flow through the intake manifold 48 and to cylinders 34 of the engine 26, where the air may be used in a combustion event(s) that is used to displace the pistons of the engine 36, thereby transmitting the force of the combustion event(s) into mechanical power that is used to drive the drivetrain of the associate vehicle. The resulting hot exhaust gas produced by the combustion event(s) may flow out of the cylinders 34 and engine 36 through an exhaust port(s) and along an exhaust line 50.

At least a portion of the hot exhaust gas from the engine 36 may be diverted from the exhaust line 50 and to an exhaust gas recirculation (EGR) system 52. The EGR system 52 is configured to recirculate the diverted exhaust gas back to the intake manifold 48. However, before the EGR system 52 recirculates exhaust gas, the exhaust gas is typically cooled by an EGR cooler 54 or heat exchanger. A coolant, such as antifreeze mixtures or non-aqueous solutions, among others, typically circulates through the EGR cooler 54. According to some designs, the coolant and/or the heated exhaust gases flow through tubes, a jacket, or other forms of conduits in the EGR cooler 54. The EGR cooler 54 may be configured so that heated exhaust gases flow around and/or over tubes containing flowing coolant, or vice versa, causing heat from the exhaust gas to be transferred to the coolant. The EGR cooler 54 may also include fins that assist with the transfer of heat from the exhaust gas to the coolant. After exiting the EGR cooler 54, the cooled exhaust gas is delivered to the intake manifold 48, thereby allowing the cooled exhaust gas to enter into the cylinders 34 with the air that was delivered to the intake manifold 48 through the intake line 38.

Exhaust gas that is not diverted to the EGR system 52 may continue to flow along the exhaust line 50 and be delivered to a high pressure turbine 54. The exhaust gas, and the heat entrained therein, may then at least assist in driving the high pressure turbine 54. Power generated by the high pressure turbine 54 may at least in part be used to power or drive the high pressure compressor 44. According to certain embodiments, the high pressure turbine 54 may be a variable geometry turbine (VGT).

Exhaust gas exiting the high pressure turbine 54 may then flow along the exhaust line 50 to a low pressure turbine 56. The low pressure turbine 56 may also be configured to be driven by the exhaust gas, and the heat entrained therein. Additionally, operation of the low pressure turbine 36 may be used to power or drive the low pressure air compressor 40. Exhaust gas exiting the low pressure turbine 56 may then be released from the exhaust line 50. For example, the exhaust gas may be outputted from the low pressure turbine 56 to an exhaust gas after-treatment system, an ancillary system that continues to utilize heat entrained in the exhaust gas, and/or into the environment.

In the embodiment illustrated in FIG. 2, the compressors 40, 44 and their associated turbines 54, 56 may provide two-stage turbochargers in series. The compressors 40, 44 may typically be used to generate a wide range of air flow needed to satisfy air flow requirements for combustion events and the EGR system 52 during various engine 36 and/or vehicle operating conditions. According to other embodiments, rather than using a two-stage turbochargers, the engine system 30, may employ a single turbocharger, including, for example, a VGT.

In the embodiment illustrated in FIG. 2, the amount of compressed air that is delivered to the cylinders 34 may be controlled by a control throttle 32. For example, the control throttle 32 may be a throttle plate or butterfly valve that is operably connected to, or is inserted in, the intake line 38 or the intake manifold 48. For example, the control throttle 32 may be housed in a throttle housing that intersects a portion of the intake line 38. Further, the control throttle 32 is positioned to restrict or prohibit the flow of air past the control throttle 32. For example, the control throttle 32 may be adjusted from a first position, where the control throttle provides minimal restriction, if any, to the flow of air along the intake line 38, to a second position, in which the control throttle 32 generally substantially restricts and/or blocks the flow of air past the control throttle 32 and/or into the cylinder(s) 34. The control throttle 32 may also be adjusted between various positions so as to allow for adjustments, and further control, of the quantity of compressed air that is allowed to flow past the control throttle 32 and subsequently into the cylinder(s) 34 during the intake stroke of an engine braking event.

The operation of the control throttle 32 may be controlled by an electronic control unit or module (ECU) 58. The ECU 58 may include logic or a control strategy that utilizes the information provided to the ECU 58 indicative of the quantity of compressed air being outputted by the high pressure compressor 44 and/or being delivered to the intake manifold 48. For example, one or more sensors 60, such as pressure and/or flow sensors, may be positioned along the intake line 38 and/or intake manifold 48 that provide information reflecting the quantity of compressed air that may enter into the cylinder(s) 34 during the intake stroke of piston during an engine braking event. Using at least this information as well as the associated control strategy or logic, the ECU 58 may determine when during the braking event the position of the control throttle 32 is to be moved, or adjusted, to either restrict or increase the quantity of compressed air available to enter into the cylinder(s) 34 during the intake stroke. The ECU 58 may then provide a signal used to operate an actuator 62 that is operably connected to the control throttle 32, and which may cause the adjustment of the position of the control throttle 32. A variety of different types of actuators 62 may be employed for adjusting the position of the control throttle 32, including, for example, electric, pneumatic/electro-pneumatic, and electro-hydraulic actuators. Further, by controlling the quantity of compressed air that is enters the cylinders 34 during the intake stroke of an engine braking event, the quantity of air that exits the engine 36 and which subsequently enters the turbine 54 may also be controlled.

Figure 3:
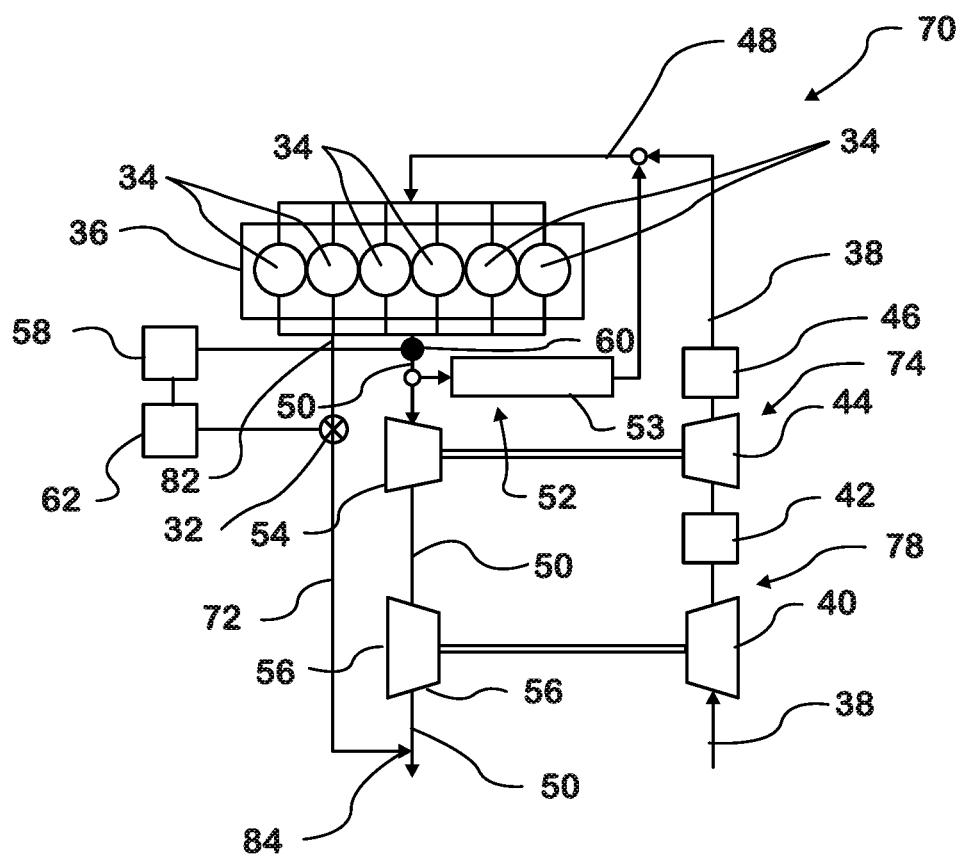
FIG. 3 illustrates an engine system that includes a control throttle along an auxiliary exhaust line that is configured to allow exhaust gases to bypass the turbine of a turbocharger.

FIG. 3 illustrates an engine system 70 that includes a control throttle 32 along an auxiliary exhaust line 72 that is configured to allow exhaust gases, such as the compressed air released from the cylinder 14 during the engine braking event, to bypass the turbine 54 of a turbocharger 74. In the embodiment illustrated in FIG. 3, similar to the exhaust line 50, a first end 82 of the auxiliary exhaust line 72 may also be operably connected to the exhaust manifold 74 of the engine 36. When the control throttle 32 is in a closed position, the exhaust gas may be prevented from flowing pass the control throttle 32 and through the auxiliary exhaust line 72, and thereby allow at least a substantial quantity of the exhaust gas to enter into the exhaust line 50. However, when the control valve 32 is not in a closed position, at least a portion of the exhaust gas removed from the cylinders 14 flows though the auxiliary exhaust line 72, while the remainder of the exhaust gas enters the exhaust line 50. The auxiliary exhaust line 72 allows exhaust gas flowing there through to bypass at least one turbine 54, 56. The auxiliary exhaust line 72 may then deliver the exhaust gas to a location downstream of turbine(s) 54, 56. For example, as shown in FIG. 3, a second end 84 of the auxiliary exhaust line 72 may be operably connected to the exhaust line 50 downstream of the high pressure turbine 54 of a first turbocharger 74 and a low pressure turbine 56 of a second turbocharger 78. Alternatively, for example, the auxiliary exhaust line 72 may deliver the exhaust gas to an exhaust gas treatment device or system or vent the exhaust gas into the atmosphere.

By allowing exhaust gas in the auxiliary exhaust line 72 to bypass the turbine 54, the mass flow of exhaust gas used to operate the turbine 54 is reduced to only that gas supplied to the turbine 54 through the exhaust line 50. Such a reduction in the quantity of exhaust gas delivered, and thereby used to drive, the turbine 54 may result in a reduction in the amount of power generated by the turbine 54 that is to be used to operate the corresponding compressor 44 of the turbocharger 74. Such reduction in the power used to operate the compressor 44 may reduce the amount of air compressed by the compressor 44, and thereby decrease the quantity of compressed air that may enter into the cylinder(s) 14 during the intake stroke of an engine braking event. For embodiments in which the turbocharger 74 is a variable-geometry turbocharger, the amount of exhaust gas energy available to the turbine 54 may be further reduced by adjusting the position of the vane located at the inlet of the turbine 54, 56.

As shown in FIG. 3, a sensor 60, such as, for example, a pressure or flow sensor may be positioned along the exhaust line 50. The sensor 60 may provide information to the ECU 58 that is used by the ECU 58 to determine if the position of the control throttle 32 should be adjusted so as to adjust or change the quantity of exhaust gas that is allowed to flow through the auxiliary exhaust line 72. Moreover, by sensing the condition or quantity of exhaust gas entering or flowing through the exhaust line 50, the ECU 58 may be able to determine whether a reduction in the amount of exhaust gas being delivered to the turbine(s) 54, 56 is necessary so as to cause a reduction in the quantity of air being compressed by the compressor(s) 40, 44. In addition, or in lieu of having the sensor 60 positioned along the exhaust line 50, the sensor 60 may also be positioned along the intake line 38 or intake manifold 48, as illustrated in FIG. 2. Again, according to certain embodiments, the ECU 58 may be able to control the positioning of the control throttle 32 through the operation of an actuator 62.

Figure 4:
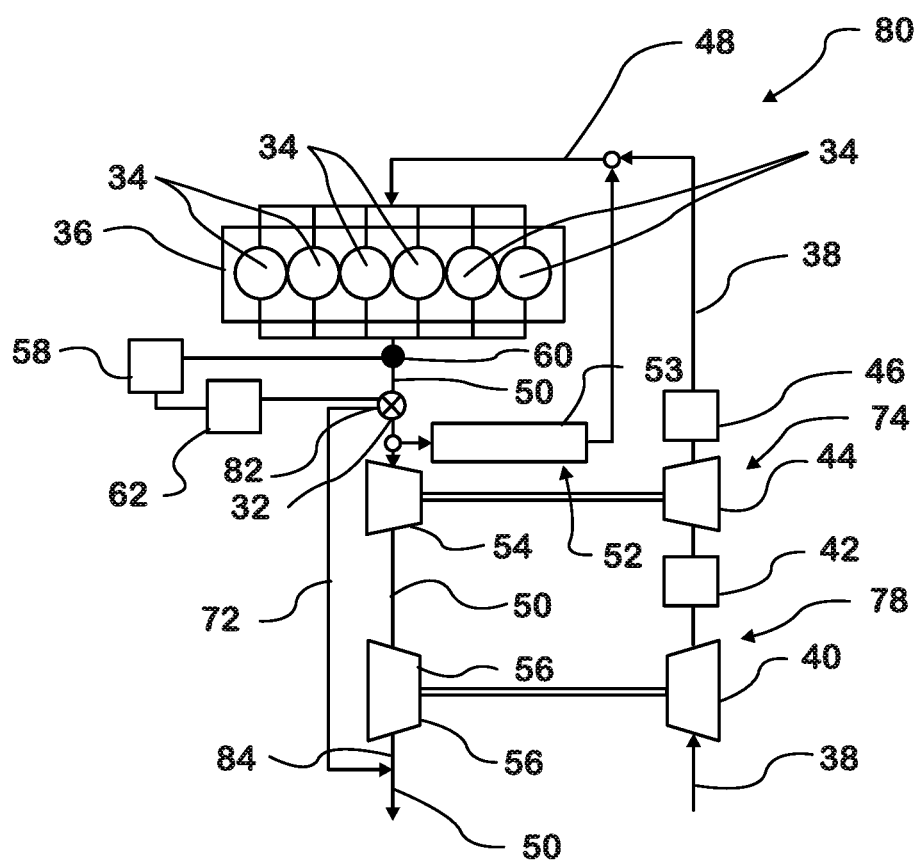
FIG. 4 illustrates an engine system that includes a control throttle along the exhaust line that is configured to allow exhaust gases to bypass the turbine of a turbocharger.

FIG. 4 illustrates an engine system 80 that includes a control throttle 32 along the exhaust line 50 that is configured to allow exhaust gases to bypass the turbine 54 of a turbocharger 74. As shown, according to certain embodiments, the control throttle 32 may be positioned along the exhaust line 50 and configured to divert at least a portion of the exhaust gas flowing through the exhaust line 50 upstream of the turbine 54 into the auxiliary exhaust line 72. Accordingly, a first end 82 of the auxiliary exhaust line 72 may be operably connected to the control throttle 32, or the housing containing the control throttle 32, such that the control throttle 32 may divert exhaust gas out of the exhaust line 50 and into the auxiliary exhaust line 72. Similar to the embodiment shown in FIG. 3, the second end 84 of the auxiliary exhaust line 72 may be operably connected to the exhaust line 50 or an exhaust treatment system downstream of one or more turbines 54, 56.

The invention claimed is:

1. A system for controlling the quantity of compressed air that may enter into the cylinder of an engine during the intake stroke of a piston during an engine braking event, the engine having an intake manifold through which air passes into the cylinder of the engine, the system comprising:

a control throttle positioned upstream of the cylinder, the control throttle configured to be adjustably positioned to restrict a quantity of compressed air that may enter into the cylinder during the intake stroke of the piston;

an engine brake actuation signal sent upon activation of the engine braking event;

a sensor disposed in fluid communication with intake manifold for sending a signal indicative of the quantity of compressed air being delivered to the intake manifold; and an engine control unit for receiving the signal indicative of the quantity of compressed air being delivered to the intake manifold, and for receiving the engine brake actuation signal, the engine control unit configured to control the position of the control throttle to a predetermined position based on the signal indicative of the quantity of compressed air being delivered to the intake manifold during engine brake actuation so as to control the quantity of compressed air being passed through the control throttle during the engine braking event.

2. The system of claim 1, further including a variable geometry turbocharger, the variable geometry turbocharger including a compressor upstream of the control throttle and a turbine downstream of the engine, and further including a vane located at approximately the inlet of the turbine, the vane being configured to be adjustable so as to reduce the air flow mass of an exhaust gas from the engine that flows into the turbine during the engine braking event.

* * * * *